United States Patent
Kubota et al.

(10) Patent No.: US 11,373,684 B2
(45) Date of Patent: Jun. 28, 2022

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yusuke Kubota, Kawasaki Kanagawa (JP); Hiroshi Oyabu, Chigasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/198,069

(22) Filed: Mar. 10, 2021

(65) Prior Publication Data
US 2022/0093129 A1    Mar. 24, 2022

(30) Foreign Application Priority Data
Sep. 18, 2020    (JP) .............................. JP2020-157429

(51) Int. Cl.
| G11B 5/54  | (2006.01) |
| G11B 20/20 | (2006.01) |
| G11B 21/08 | (2006.01) |
| G11B 5/012 | (2006.01) |

(52) U.S. Cl.
CPC .............. G11B 21/08 (2013.01); G11B 5/012 (2013.01)

(58) Field of Classification Search
CPC ....... G11B 5/59627; G11B 5/012; G11B 5/09; G11B 19/04; G11B 15/04; G11B 5/58; G11B 5/59677; G11B 5/59655; G11B 5/596; G11B 2220/20; G11B 2220/90; G11B 27/3027; G11B 27/36; G11B 5/54; G11B 5/5539; G11B 20/20
USPC ....... 360/75, 77.08, 77.04, 77.01, 77.02, 60, 360/48, 76
See application file for complete search history.

(56) References Cited

U.S. PATENT DOCUMENTS

| 6,975,468 | B1   | 12/2005 | Melrose et al. |
| 7,245,447 | B2   | 7/2007  | Zaitsu |
| 7,570,445 | B2   | 8/2009  | Alfred et al. |
| 9,495,988 | B1 * | 11/2016 | Liu .................... G11B 20/1217 |

* cited by examiner

*Primary Examiner* — Nabil Z Hindi
(74) *Attorney, Agent, or Firm* — Kim & Stewart LLP

(57) ABSTRACT

According to one embodiment, a magnetic disk apparatus includes a magnetic disk, a magnetic head, and a controller. The magnetic disk includes a plurality of tracks. The magnetic head performs read/write from/to the plurality of tracks. The controller controls, in a first case in which, during execution of write to a first track among the plurality of tracks, a position of the magnetic head is displaced from a target position corresponding to the first track toward a second track, and a first distance exceeds a first threshold, write to the second track under a condition different from a condition in a second case in which the first distance is less than the first threshold. The second track is a track different from the first track among the plurality of tracks. The first distance is the distance between the target position and the position of the magnetic head.

17 Claims, 9 Drawing Sheets

MAGNETIC DISK APPARATUS AND METHOD

CROSS-REFERENCE TO RELATED APPLICATIONS

This application is based upon and claims the benefit of priority from Japanese Patent Application No. 2020-157429, filed on Sep. 18, 2020; the entire contents of which are incorporated herein by reference.

FIELD

Embodiments described herein relate generally to a magnetic disk apparatus and a method.

BACKGROUND

In a magnetic disk apparatus, a magnetic head writes data to and reads data from a magnetic disk. It is desirable to control the operation of the magnetic head appropriately.

DETAILED DESCRIPTION

In general, according to one embodiment, a magnetic disk apparatus includes a magnetic disk, a magnetic head, and a controller. The magnetic disk includes a plurality of tracks. The magnetic head performs read/write from/to the plurality of tracks. The controller controls, in a first case in which, during execution of write to a first track among the plurality of tracks, a position of the magnetic head is displaced from a target position corresponding to the first track toward a second track, and a first distance exceeds a first threshold, write to the second track under a condition different from a condition in a second case in which the first distance is less than the first threshold. The second track is a track different from the first track among the plurality of tracks. The first distance is the distance between the target position and the position of the magnetic head.

Exemplary embodiments of the magnetic disk apparatus and a method will be explained below in detail with reference to the accompanying drawings. The present invention is not limited to the following embodiments.

First Embodiment

Figure 1:
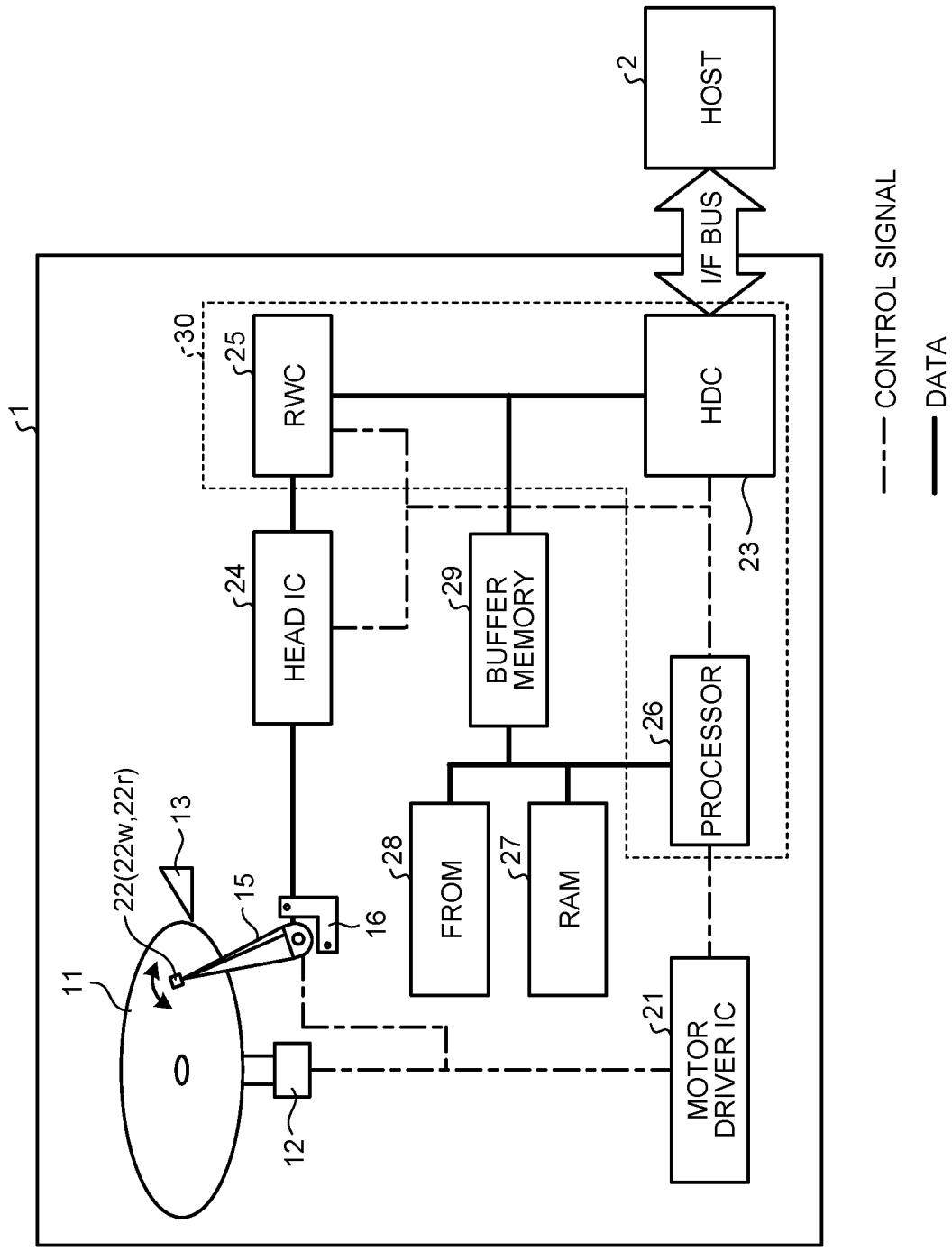
FIG. 1 is a schematic diagram illustrating an example of a configuration of a magnetic disk apparatus of a first embodiment.

FIG. 1 is a schematic diagram illustrating an example of the configuration of a magnetic disk apparatus 1 of a first embodiment.

The magnetic disk apparatus 1 is connected to a host 2. The magnetic disk apparatus 1 is capable of receiving access commands, such as write commands or read commands, from the host 2.

The magnetic disk apparatus 1 includes a magnetic disk 11, the magnetic disk 11 having a recording surface formed on the surface thereof. The magnetic disk apparatus 1 writes data to and reads data from the magnetic disk 11 (more precisely, the recording surface of the magnetic disk 11) in response to the access command. Note that although the magnetic disk apparatus 1 may include a plurality of magnetic disks 11, the magnetic disk apparatus 1 includes one magnetic disk 11 in the embodiment to simplify explanation and illustration.

Data is written and read through a magnetic head 22. Specifically, the magnetic disk apparatus 1 includes, in addition to the magnetic disk 11, a spindle motor 12, a motor driver integrated circuit (IC) 21, the magnetic head 22, an actuator arm 15, a voice coil motor (VCM) 16, a ramp 13, a head IC 24, a read write channel (RWC) 25, a RAM 27, a flash read only memory (FROM) 28, a buffer memory 29, a hard disk controller (HDC) 23, and a processor 26.

The magnetic disk 11 is rotated at a predetermined rotation speed by the spindle motor 12 which is attached to a rotation shaft of the magnetic disk 11. The spindle motor 12 is driven by the motor driver IC 21.

The motor driver IC 21 controls the rotation of the spindle motor 12 and the turn of the VCM 16.

The magnetic head 22 writes data to and reads data from the magnetic disk 11 by using a write element $22w$ and a read element $22r$ which are included in the magnetic head 22. The magnetic head 22 is attached to the distal end of the actuator arm 15. The magnetic head 22 is moved in the radial direction of the magnetic disk 11 by the VCM 16 which is driven by the motor driver IC 21.

For example, when the rotation of the magnetic disk 11 is stopped, the magnetic head 22 is moved onto the ramp 13. The ramp 13 is configured to hold the magnetic head 22 at a position away from the magnetic disk 11.

In reading, the head IC 24 amplifies and outputs a signal read by the magnetic head 22 from the magnetic disk 11 and supplies the amplified signal to the RWC 25. Moreover, the head IC 24 amplifies a signal corresponding to data to be written, the signal being supplied from the RWC 25, and supplies the amplified signal to the magnetic head 22.

The HDC 23 performs, for example, control of transmission and reception of data to and from the host 2 via an I/F bus, control of the buffer memory 29, and an error correction process on read data.

The buffer memory 29 is used as a buffer for data transmitted to and received from the host 2. For example, the buffer memory 29 is used to temporarily store data to be written to the magnetic disk 11 or data read from the magnetic disk 11.

The buffer memory 29 includes, for example, a volatile memory capable of operating at high speed. The type of the memory constituting the buffer memory 29 is not limited to any particular type. The buffer memory 29 may include, for example, a dynamic random access memory (DRAM), a static random access memory (SRAM), or a combination of these memories.

The RWC 25 modulates data to be written supplied from the HDC 23 and supplies the modulated data to the head IC 24. Moreover, the RWC 25 demodulates a signal that is read from the magnetic disk 11 and supplied from the head IC 24 and outputs the demodulated signal as digital data to the HDC 23.

The processor 26 is, for example, a central processing unit (CPU). The RAM 27, the flash read only memory (FROM) 28, and the buffer memory 29 are connected to the processor 26.

The FROM 28 is a nonvolatile memory. Firmware (program data) and various operation parameters are stored in the FROM 28. Note that the firmware may be stored in the magnetic disk 11.

The RAM 27 includes, for example, a DRAM, an SRAM, or a combination of these memories. The RAM 27 is used as a memory for operation by the processor 26. The RAM 27 is used as an area where the firmware is loaded or an area where various pieces of management data are held.

The processor 26 performs overall control of the magnetic disk apparatus 1 in accordance with the firmware stored in the FROM 28 or the magnetic disk 11. For example, the processor 26 loads the firmware from the FROM 28 or the magnetic disk 11 into the RAM 27 and controls the motor driver IC 21, the head IC 24, the RWC 25, and the HDC 23 in accordance with the loaded firmware.

Note that a configuration including the RWC 25, the processor 26, and the HDC 23 can also be regarded as a controller 30. The controller 30 may include, in addition to these elements, the processor 26, and the HDC 23, other elements (e.g., the RAM 27, the FROM 28, the buffer memory 29, or the RWC 25).

Figure 2:
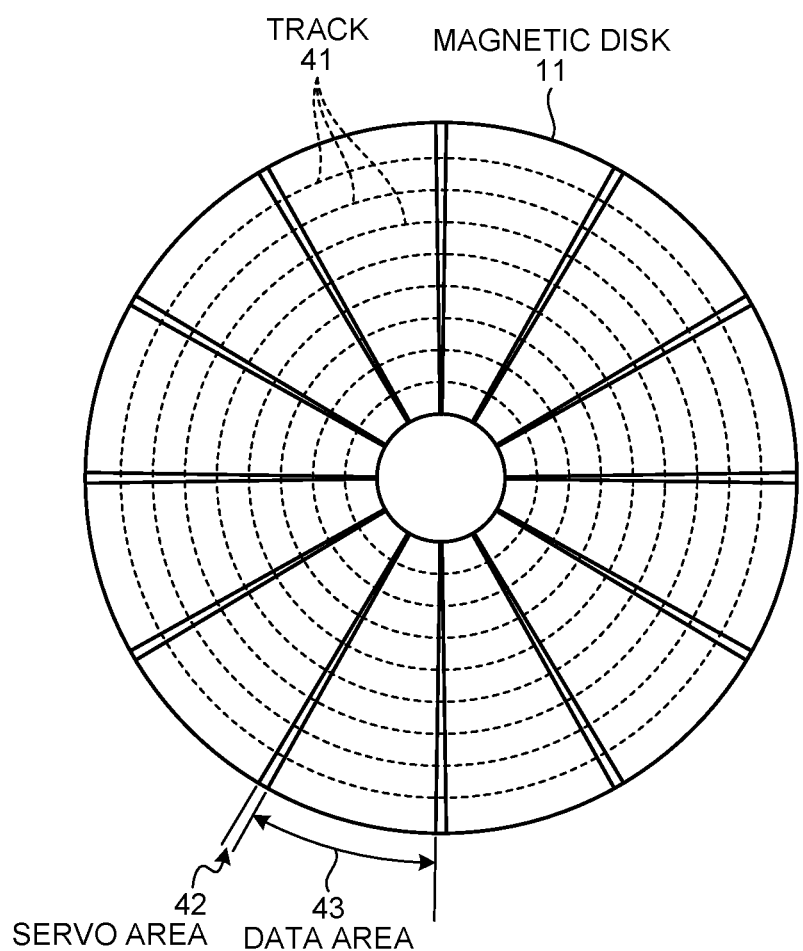
FIG. 2 is a schematic diagram illustrating an example of a configuration of a magnetic disk of the first embodiment.

FIG. 2 is a schematic diagram illustrating an example of the configuration of the magnetic disk 11 of the first embodiment.

In a manufacturing process, servo information is written to the magnetic disk 11 by, for example, a servo writer or self-servo write (SSW). FIG. 2 illustrates servo areas 42 which are radially arranged as an example of arrangement of servo areas in which the servo information is written.

The servo information includes, for example, sector/cylinder information, a burst pattern, and a post code. The sector/cylinder information can provide a servo address in the circumferential direction (servo sector address) and a servo address in the radial direction (track address) of the magnetic disk 11. During operation of the magnetic disk apparatus 1, the sector/cylinder information is used to control a seek operation for moving the magnetic head 22 to a target track.

The burst pattern defines the position of each of the tracks. In other words, the burst pattern defines each track. A position of a track defined by the burst pattern may be deviated from an actual position of the track due to an error in writing the servo information. The positional deviation repeatedly occurs in a similar manner at a period corresponding to one rotation of the magnetic disk (or one rotation of the spindle motor) and is thus called RRO. In the manufacturing process, the RRO is learned on a track-by-track basis, and a learned value of the RRO is written as post codes to the magnetic disk 11. When the magnetic head 22 is positioned at the target track in using the magnetic disk apparatus 1, control to cancel, based on the post codes, the positional deviation caused by the RRO is executed.

According to FIG. 2, a plurality of tracks 41, which are concentric circles, are set by the burst patterns and the post codes. The servo areas 42 on one track 41 can be referred to as servo sectors. Data areas 43 to which data can be written are provided between the servo areas 42 (that is, the servo sectors) on the circumference of each track 41. The data area 43 includes a plurality of data sectors which are continuously formed. The magnetic head 22 writes data to and reads data from each data sector.

A signal read by the magnetic head 22 (more precisely, the read element 22r) includes servo information read from the servo sector and data read from the data sector. The servo information read by the magnetic head 22 is demodulated by the head IC 24 to a positional error signal indicating the relative position of the magnetic head 22 from the track and supplied to the controller 30. The controller 30 executes positioning control for the magnetic head 22 based on the supplied positional error signal in cooperation with the motor driver IC 21.

For example, the controller 30 and the motor driver IC 21 execute feedback control to bring, based on the positional error signal, the difference between the position of the target track and the current position of the magnetic head 22 close to zero.

A moving operation of the magnetic head 22 broadly includes a seek operation and a track following operation. The seek operation moves the magnetic head 22 in the radial direction of the magnetic disk 11 toward the target track. The track following operation maintains the position of the magnetic head 22 on the target track after the magnetic head 22 is moved to the vicinity of the target track by the seek operation. In the track following operation, the position of the magnetic head 22 is adjusted so that the magnetic head 22 relatively moves along the target track under the above feedback control. The state where the position of the magnetic head 22 is maintained on the target track is referred to as an on-track state.

Write and read of data are executed when the magnetic head 22 is in the on-track state. That is, the controller 30 determines whether the magnetic head 22 is in the on-track state and executes write of data or read of data using the magnetic head 22 when the magnetic head 22 is in the on-track state.

Whether the magnetic head 22 is in the on-track state or not is determined based on a threshold that is set with respect to the position of the track. For example, a threshold used in the determination of the on-track state in a write operation is referred to as a write offtrack slice (WOS).

Figure 3:
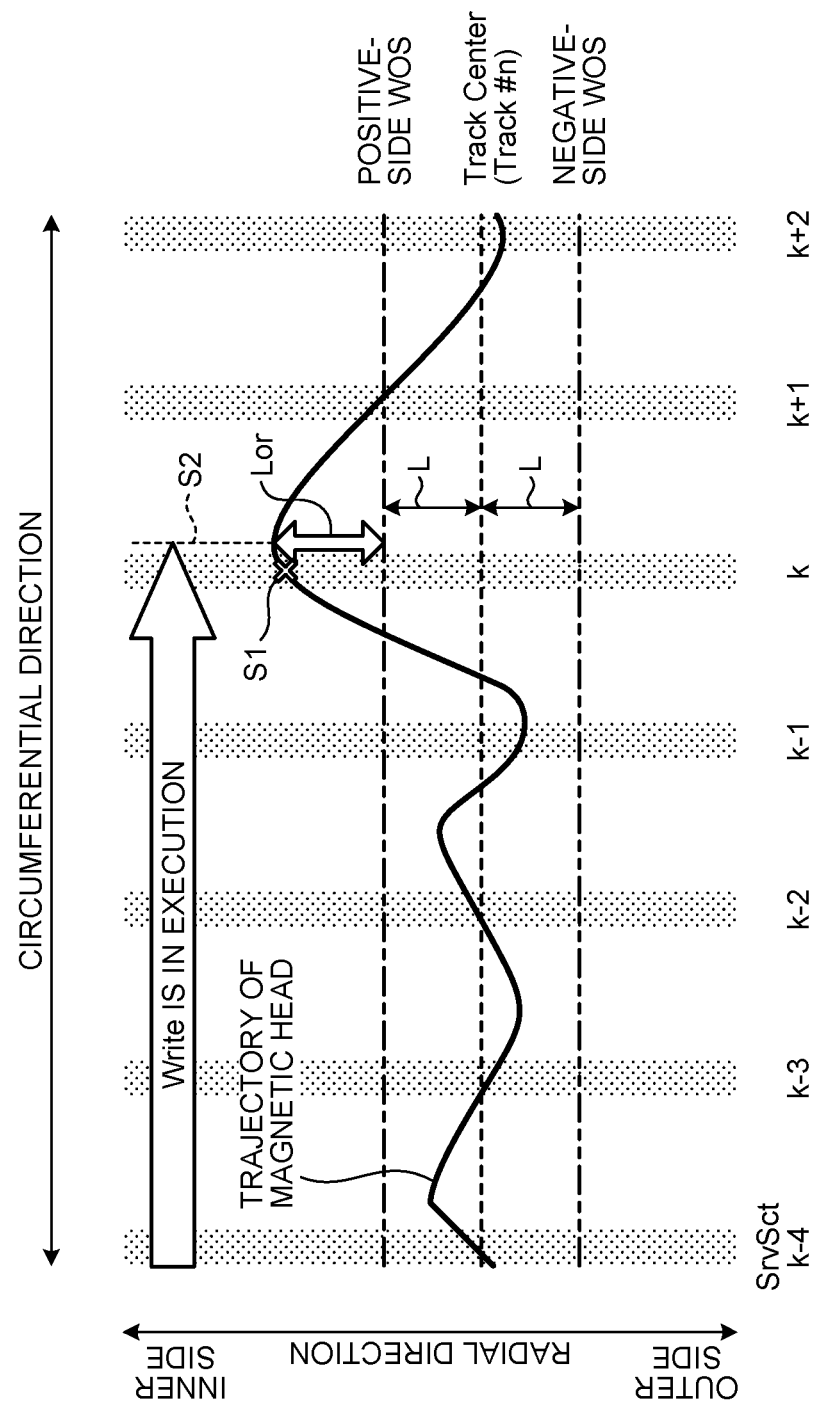
FIG. 3 is a schematic diagram for explaining an example of an operation of a magnetic head according to the first embodiment in writing data.

FIG. 3 is a schematic diagram for explaining an example of an operation of the magnetic head 22 according to the first embodiment in writing data. Note that, when the position in the radial direction is mentioned, the inner side of the magnetic disk 11 is defined as the positive side, and the outer side of the magnetic disk 11 is defined as the negative side. Note that a designer can determine, as desired, which one of the inner side and the outer side of the magnetic disk 11 is defined as the positive side for the position in the radial direction.

FIG. 3 includes servo sectors #k−4 to #k+2 as a plurality of servo sectors (SrvSct). FIG. 3 further includes the center of a track #n as one of the tracks. FIG. 3 further includes a trajectory of the magnetic head 22 in writing data to the track #n.

In writing data to the track #n, the track following operation adjusts the position of the magnetic head 22 so that the difference between the position of the magnetic head 22 and the center of the track #n becomes close to zero.

However, the position of the magnetic head 22 may be displaced from the target position due to various disturbances. As a result, as illustrated in FIG. 3, the trajectory of the magnetic head 22 is deviated from the center of the track #n.

A displacement allowable range of the magnetic head 22 in writing data is set for each track in advance. A line defining the boundary of the displacement allowable range corresponds to the WOS. According to FIG. 3, a positive-side WOS is set at a position that is away from the center of the track #n by a fixed value L to the positive side, and a negative-side WOS is set at a position that is away from the center of the track #n by the fixed value L to the negative side.

During the execution of write of data to the track #n, servo information is read every time the magnetic head 22 passes through the servo sector, and a positional error signal generated from the read servo information is supplied to the controller 30. Every time the controller 30 acquires the positional error signal, the controller 30 estimates, based on the acquired positional error signal, whether the magnetic head 22 is located within the displacement allowable range.

Figure 4:
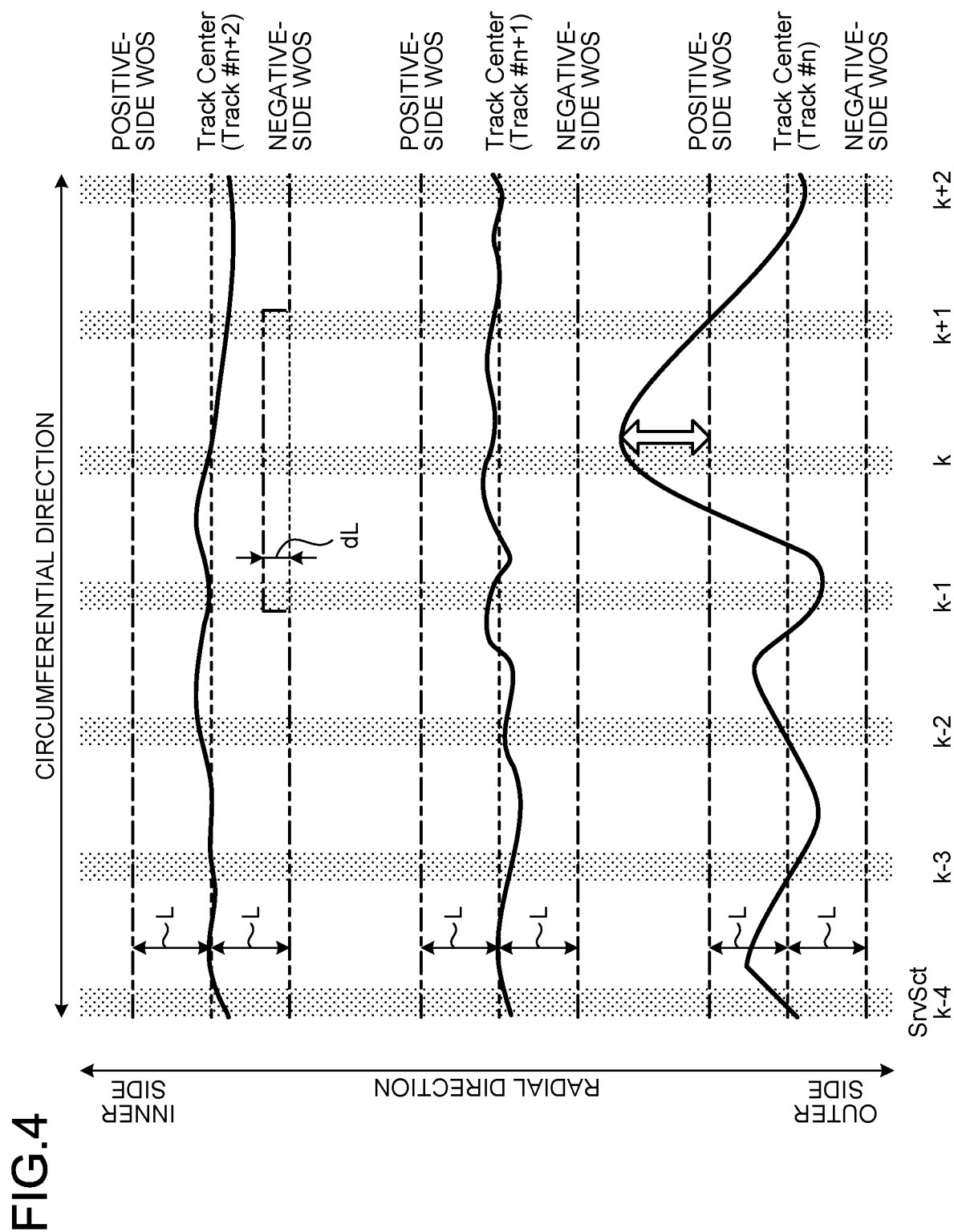
FIG. 4 is a schematic diagram for explaining a method for setting a WOS according to the first embodiment.

Specifically, the controller 30 compares, based on the positional error signal, the distance between the position of the magnetic head 22 and a target position corresponding to the track #n (e.g., the center of the track #n) with a threshold corresponding to the WOS (L in FIG. 4). When the distance between the position of the magnetic head 22 and the target position corresponding to the track #n exceeds the threshold corresponding to the WOS, the controller 30 estimates that the magnetic head 22 is deviated from the displacement allowable range. When the distance between the position of the magnetic head 22 and the target position corresponding to the track #n is less than the threshold corresponding to the WOS, the controller 30 estimates that the magnetic head 22 is located within the displacement allowable range. When the distance between the position of the magnetic head 22 and the target position corresponding to the track #n is equal to the threshold corresponding to the WOS, the controller 30 performs estimation in any manner. The controller 30 may estimate that the magnetic head 22 is located within the displacement allowable range or may estimate that the magnetic head 22 is deviated from the displacement allowable range.

When it is estimated that the magnetic head 22 is deviated from the displacement allowable range, the magnetic head 22 is not in the on-track state. Thus, the controller 30 stops the write to the track #n.

After the write to the track #n is stopped, when the magnetic disk 11 further makes one rotation, and the magnetic head 22 again approaches the write stop position, the controller 30 again estimates whether the magnetic head 22 is located within the displacement allowable range or not. Then, when it is estimated that the magnetic head 22 is located within the displacement allowable range, the controller 30 resumes the write to the track #n. This process is referred to as write retry.

The pieces of servo information are discretely recorded in the circumferential direction of the magnetic disk 11. Thus, the controller 30 intermittently acquires positional error signals. Furthermore, there is a slight lag between when the magnetic head 22 reads the servo information and when the controller 30 acquires and uses the positional error signal. Thus, it is difficult for the controller 30 to completely prevent the magnetic head 22 from being deviating from the displacement allowable range. The position of the magnetic head 22 may be largely deviated from the displacement allowable range at the timing when the magnetic head 22 passes through the servo sector or the timing when the controller 30 detects the deviation and stops the write.

According to the example illustrated in FIG. 3, at the timing when the magnetic head 22 passes through the servo sector #k, the position of the magnetic head 22 has already been beyond the positive-side WOS (S1). Then, a positional error signal generated from servo information read from the servo sector #k is transmitted to the controller 30. After S1, the controller 30 detects, based on the positional error signal generated from the servo information read from the servo sector #k, that the magnetic head 22 has been displaced beyond the positive-side WOS and stops the write of data (S2). At the timing of S2 when the write of data is stopped, a deviation amount from the displacement allowable range becomes larger than at the timing of S1.

A deviation of the position of the magnetic head 22 from the displacement allowable range will be referred to as an overrun. The deviation amount of the position of the magnetic head 22 from the displacement allowable range at the time of stopping the write will be referred to as an overrun amount. For example, in FIG. 3, Lor corresponds to the overrun amount.

The write operation has a magnetic influence not only on a write destination track, but also on data that has already been written to a track adjacent to the write destination track. The magnetic influence may be referred to as an adjacent track interference (ATI). The ATI may make it difficult to correctly read the data that has already been written to the track adjacent to the write destination track. In other words, the data of the track adjacent to the write destination track may get lost. To prevent loss of the data of the track adjacent to the write destination track, minimizing the overrun amount is typically desired.

The risk of loss of data that has already been written to a track becomes particularly high when the magnetic head 22 makes an overrun toward the track from adjacent tracks on both sides thereof.

For example, assume that a track #n+1 and a track #n+2 are set in this order on the positive side of the track #n. After an overrun of the magnetic head 22 to the positive side, that is, toward the track #n+1 occurs in writing data to the track #n, data is written to the track #n+2. When an overrun of the magnetic head 22 to the negative side, that is, toward the track #n+1 occurs in writing data to the track #n+2, data that has already been written to the track #n+1 is affected by the overruns from both sides. In such a case, it is considered that the possibility of loss of the data of the track #n+1 is extremely high.

Rewriting the data of the track #n+1 can be considered as one method for reducing the risk of loss of the data of the track #n+1 caused by the overruns from the adjacent tracks on both sides. This method is referred to as a comparative example. According to the comparative example, when an overrun of the magnetic head toward the track #n+1 occurs in writing data to the track #n, the controller reads data of the track #n+1 and overwrites the read data to the track #n+1. This recovers magnetic information of the data of the track #n+1. Thus, even if an overrun of the magnetic head to the negative side, that is, toward the track #n+1 occurs in writing data to the track #n+2, the risk of loss of the data of the track #n+1 is reduced.

However, the comparative example requires a storage area for holding data read from the track #n+1 until the data is rewritten to the track #n+1. For example, when a buffer memory is used as the storage area, a capacity required of the buffer memory increases, which increases the cost of the magnetic disk apparatus. Furthermore, the process of reading data from the track #n+1 and writing the data to the track #n+1 takes an extra time.

According to the embodiment, when, in writing data to a certain track (e.g., the track #n), an overrun of the magnetic head 22 toward the track #n+1 occurs, the controller 30 makes a condition for writing data to the track #n+2 stricter than normal to reduce the influence on data of the track #n+1 in writing data to the track #n+2. In the first embodiment, the WOS is used as the condition that is made stricter.

FIG. 4 is a schematic diagram for explaining a method for setting the WOS according to the first embodiment. In the example illustrated in FIG. 4, it is assumed that data is written to the track #n in a state where data of the track #n+1 has already been written, and an overrun similar to that of FIG. 3 occurs in writing the data to the track #n. That is, in writing the data to the track #n, an overrun toward the track #n+1 occurs near the servo sector #k.

In such a case, differently from the comparative example, the controller 30 does not execute rewrite of the data of the track #n+1. When data is written to the track #n+2 thereafter, the controller 30 tightens, among two WOSs corresponding to the track #n+2, the WOS at the track #n+1 side (that is, the negative-side WOS) more than normal. The controller 30 changes the negative-side WOS corresponding to the track #n+2 in such a manner that the negative-side WOS corresponding to the track #n+2 is brought closer to the center of the track #n+2 than when no overrun occurs in write to the track #n. In the example illustrated in FIG. 4, the negative-side WOS corresponding to the track #n+2 is changed in such a manner as to be closer to the center of the track #n+2 by dL in a predetermined range including, on the center, the servo sector #k where an overrun has occurred in the track #n (specifically, the range from the servo sector #k−1 to the servo sector #k+1).

With this configuration, even if an overrun toward the track #n+1 occurs in write to the track #n+2, the overrun amount toward the track #n+1 is reduced by an amount corresponding to the tightening of the WOS. Thus, even if an overrun toward the track #n+1 occurs in write to the track #n+2, it is possible to reduce the influence of the write operation to the track #n+2 on data that has already been written to the track #n+1. As a result, it is possible to reduce the risk of loss of the data of the track #n+1 without executing rewrite of the data of the track #n+1.

Figure 5:
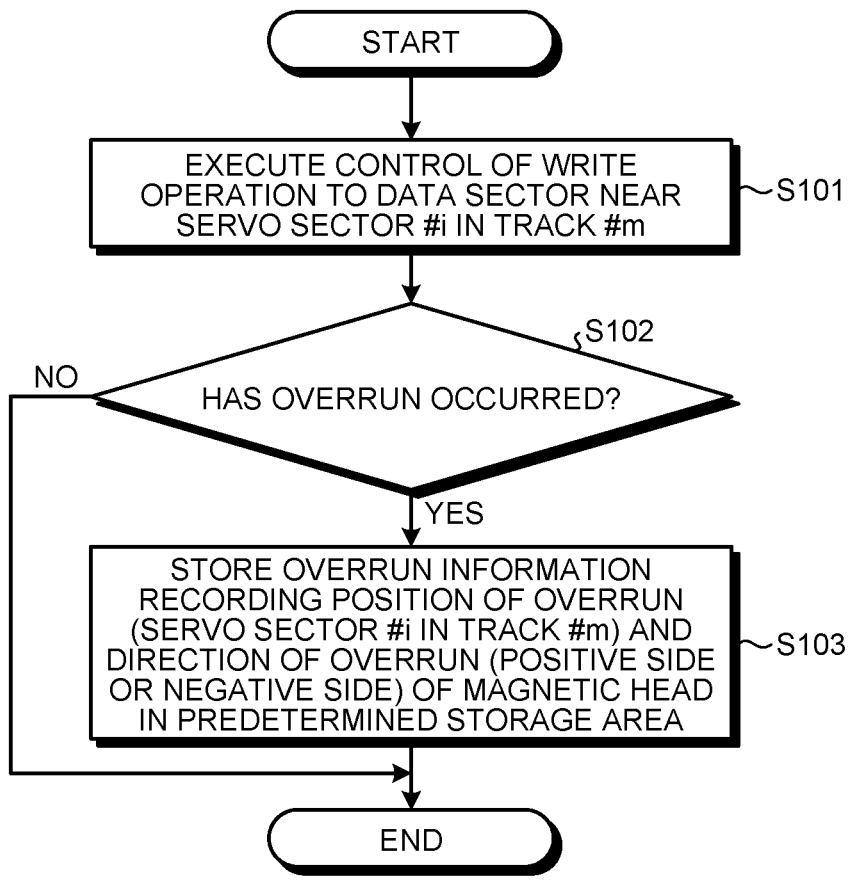
FIG. 5 is a flowchart for explaining a write operation according to the first embodiment.

FIG. 5 is a flowchart for explaining a write operation according to the first embodiment. The operation illustrated in FIG. 5 is executed regardless of which data sector in which track is the write destination. Here, for example, a data sector near the servo sector #i in the track #m is the write destination. Specifically, the data sector near the servo sector #i in the track #m is a data sector present in a section from the servo sector #i to just before the servo sector #i+1 in the track #m.

First, the controller 30 executes control to write data to the data sector near the servo sector #i in the track #m using, for example, the magnetic head 22 (S101). Then, the controller 30 determines whether an overrun has occurred in the process of S101 (S102).

The occurrence of an overrun is determined based on the comparison between the current position of the magnetic head 22 near the servo sector #i and the WOS near the servo sector #i.

Specifically, in S101, the controller 30 acquires a positional error signal corresponding to servo information read by the magnetic head 22 from the servo sector #i in the track #m. Then, the controller 30 estimates, based on the acquired positional error signal, the position of the magnetic head 22 (more precisely, the distance from the center of the track #m). Then, the controller 30 determines whether an overrun has occurred based on the comparison between the estimated position of the magnetic head 22 and the WOS near the servo sector #i.

When it is determined that an overrun has occurred (S102: Yes), the controller 30 stores overrun information corresponding to the servo sector #i in the track #m in a predetermined storage area (S103).

The overrun information includes at least the position where the overrun has occurred and the direction in which the magnetic head 22 has made the overrun. Here, the position where the overrun has occurred is the servo sector #i in the track #m. The direction in which the magnetic head 22 has made the overrun is the positive side or the negative side.

The predetermined storage area can be set in any manner. The predetermined storage area may be the RAM 27, the FROM 28, or the magnetic disk 11. The predetermined storage area may be the FROM 28 or the magnetic disk 11 so as to prevent loss of the overrun information when power is interrupted. Alternatively, the predetermined storage area may be the RAM 27, and the controller 30 may save the overrun information inside the RAM 27 onto the FROM 28 or the magnetic disk 11 before power interruption.

After S103, or when it is determined that no overrun has occurred (S102: No), the controller 30 finishes the write operation.

When it is determined that an overrun has occurred, the controller 30 stops the write operation and executes write retry as described above with reference to FIG. 3.

According to the example described above with reference to FIG. 5, the controller 30 estimates the position of the magnetic head 22 based on the positional error signal corresponding to the servo information read from the servo sector #i. The method for estimating the position of the magnetic head 22 is not limited thereto. Furthermore, the position to be compared with the WOS is not limited to the current position of the magnetic head 22.

For example, the controller 30 may estimate the position near the servo sector #i based on a positional error signal corresponding to servo information read from the servo sector #i−2 and a positional error signal corresponding to servo information read from the servo sector #i−1.

Alternatively, the controller 30 may estimate the position of the magnetic head 22 based on a positional error signal corresponding to servo information read from the servo sector #i−1 and a positional error signal corresponding to servo information read from the servo sector #i.

In these manner, the controller 30 can estimate the position of the magnetic head 22 by any method based on a positional error signal corresponding to servo information read from any servo sector.

Figure 6:
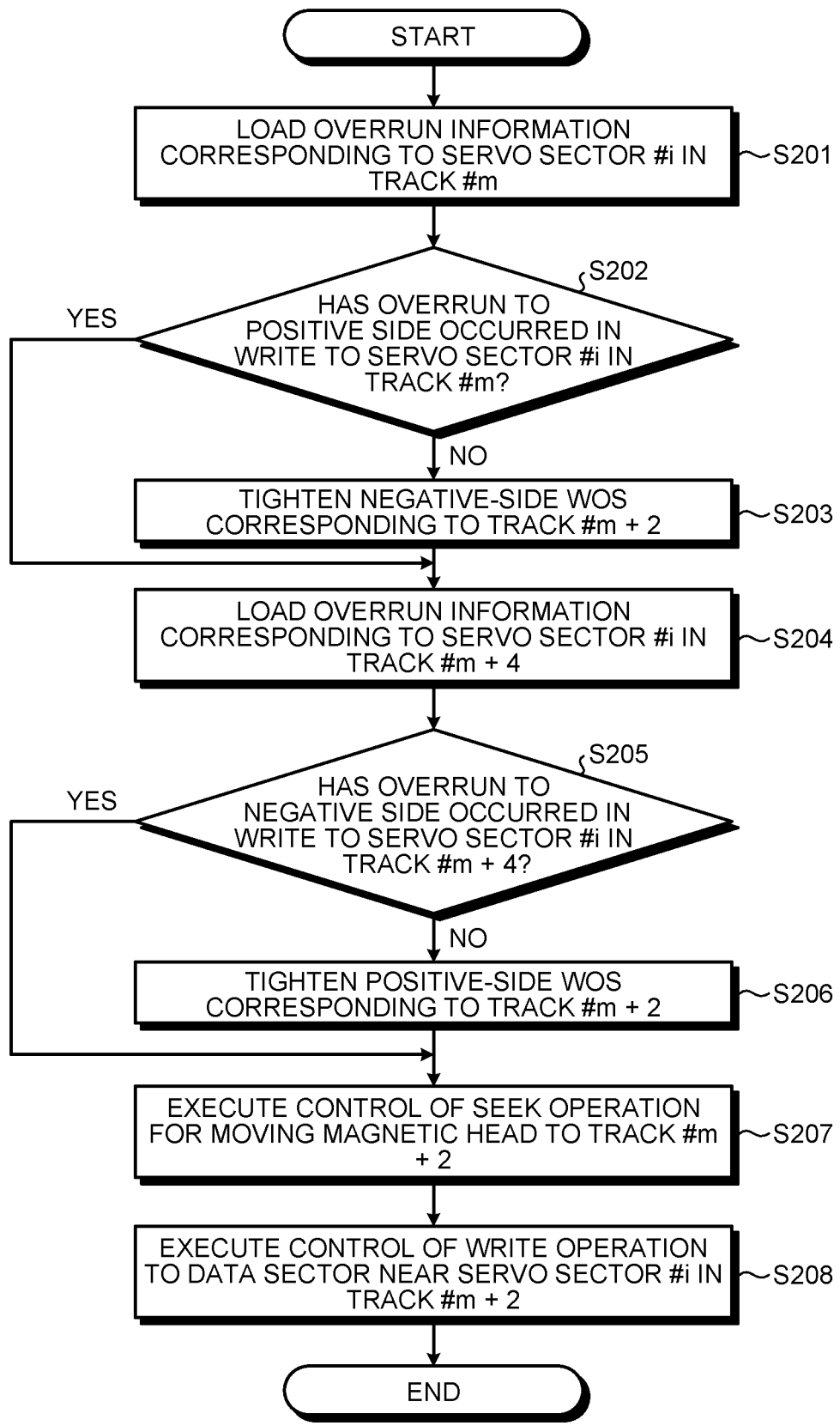
FIG. 6 is a flowchart for explaining a series of operations related to change of the WOS according to the first embodiment.

FIG. 6 is a flowchart for explaining a series of operations related to change of the WOS according to the first embodiment. The series of operations illustrated in FIG. 6 is executed regardless of which data sector in which track is the write destination. Here, an operation related to change of the WOS in write to a data sector near the servo sector #i in the track #m+2 will be described. Specifically, the data sector near the servo sector #i in the track #m+2 is a data sector present in a section from the servo sector #i to just before the servo sector #i+1 in the track #m+2.

First, the controller 30 loads overrun information corresponding to the servo sector #i in the track #m (S201).

Then, the controller 30 determines, based on the overrun information corresponding to the servo sector #i in the track #m, whether an overrun to the positive side, that is, toward the track #m+1 has occurred in write to the servo sector #i in the track #m (S202).

When it is determined that an overrun to the positive side has occurred in write to the servo sector #i in the track #m (S202: Yes), the controller 30 tightens the negative-side WOS among the two WOSs corresponding to the track #m+2 (S203). For example, the controller 30 performs a change that brings the negative-side WOS corresponding to the track #m+2 close to the center of the track #m+2 in the data sector near the servo sector #i.

When it is determined that no overrun to the positive side has occurred in write to the servo sector #i in the track #m (S202: No), the controller 30 skips the process of S203.

Then, the controller 30 loads overrun information corresponding to the servo sector #i in the track #m+4 (S204).

Then, the controller 30 determines, based on the overrun information corresponding to the servo sector #i in the track #m+4, whether an overrun to the negative side, that is, toward the track #m+3 has occurred in write to the servo sector #i in the track #m+4 (S205).

When it is determined that an overrun to the negative side has occurred in write to the servo sector #i in the track #m+4 (S205: Yes), the controller 30 tightens the positive-side WOS among the two WOSs corresponding to the track #m+2 (S206). For example, the controller 30 performs a change that brings the positive-side WOS corresponding to the track #m+2 close to the center of the track #m+2 in the data sector near the servo sector #i.

When it is determined that no overrun to the negative side has occurred in write to the servo sector #i in the track #m+4 (S205: No), the controller 30 skips the process of S206.

Then, the controller 30 executes control of a seek operation for moving the magnetic head 22 to the track #m+2 (S207). When the seek operation is completed, the controller 30 executes control of a write operation to the data sector near the servo sector #i in the track #m+2 (S208). In S208, the write operation is executed in the same procedure as the operation illustrated in FIG. 5.

Then, the operation related to change of the WOS is completed.

In the above, the negative-side WOS corresponding to the track #m+2 is tightened when an overrun to the positive side occurs in write to the servo sector #i in the track #m, and the positive-side WOS corresponding to the track #m+2 is tightened when an overrun to the negative side occurs in write to the servo sector #i in the track #m+4. The method of the tightening is not limited thereto.

For example, the controller 30 may tighten the two WOSs corresponding to the track #m+2 by the same amount when an overrun to the positive side occurs in write to the servo sector #i in the track #m or when an overrun to the negative side occurs in write to the servo sector #i in the track #m+4.

Furthermore, the range within which the WOS is tightened in the circumferential direction of the track can be set to any range. For example, in the example illustrated in FIG. 4, the tightening of the WOS is executed in the range corresponding to three servo sectors including, on the center, the servo sector #k where an overrun has occurred. The controller 30 may execute the tightening of the WOS in the entire range in the circumferential direction. For example, when an overrun toward the track #m+1 occurs in writing data to the data sector near the servo sector #i in the track #m, the controller 30 may bring the negative-side WOS corresponding to the track #m+2 close to the center of the track #m+2 uniformly in the entire circumference of the track #m+2.

Furthermore, the change amount of the WOS may be constant or may be configured to be variable. For example, the controller 30 may increase the change amount of the WOS as the overrun amount increases. When the change amount of the WOS is configured to be variable, an upper limit, a lower limit, or both of the upper limit and the lower limit may be set in the change mount of the WOS. Note that when the change amount of the WOS is changed according to the overrun amount, the controller 30 records the overrun amount in the overrun information in the process of S103 in FIG. 5. In the processes of S203 and S206 in FIG. 6, the controller 30 determines the change amount of the WOS based on the overrun amount recorded in the overrun information. The relationship between the overrun amount and the change amount of the WOS is any relationship. For example, the overrun amount and the WOS may have a relationship represented by a linear function or may have a relationship represented by a quadratic function. The controller 30 makes the change amount larger when the overrun amount is large than when the overrun amount is small.

Note that a method for estimating the overrun amount is any method. For example, a case in which the controller 30 detects an overrun when the magnetic head 22 passes through the servo sector #i in the track #m will be considered. In this case, the controller 30 may record, as the overrun amount, a value obtained by subtracting the WOS from a positional error signal generated from servo information read from the servo sector #i.

Alternatively, the controller 30 may estimate the overrun amount based on a positional error signal generated from servo information read from the servo sector #i−1 and a positional error signal generated from servo information read from the servo sector #i. That is, the difference between the positional error signal generated from the servo information read from the servo sector #i−1 and the positional error signal generated from the servo information read from the servo sector #i corresponds to a displacement speed in the radial direction of the magnetic head 22. The controller 30 can calculate the displacement amount from the position of the magnetic head 22 in the servo sector #i by, for example, multiplying the displacement speed by a time required between when an overrun is detected and when write is stopped. The controller 30 can obtain an estimated value of the overrun amount by adding the displacement amount to the position of the magnetic head 22 in the servo sector #i.

That is, the controller 30 may estimate the overrun amount based on time-series information of the positional error signal.

Figure 7:
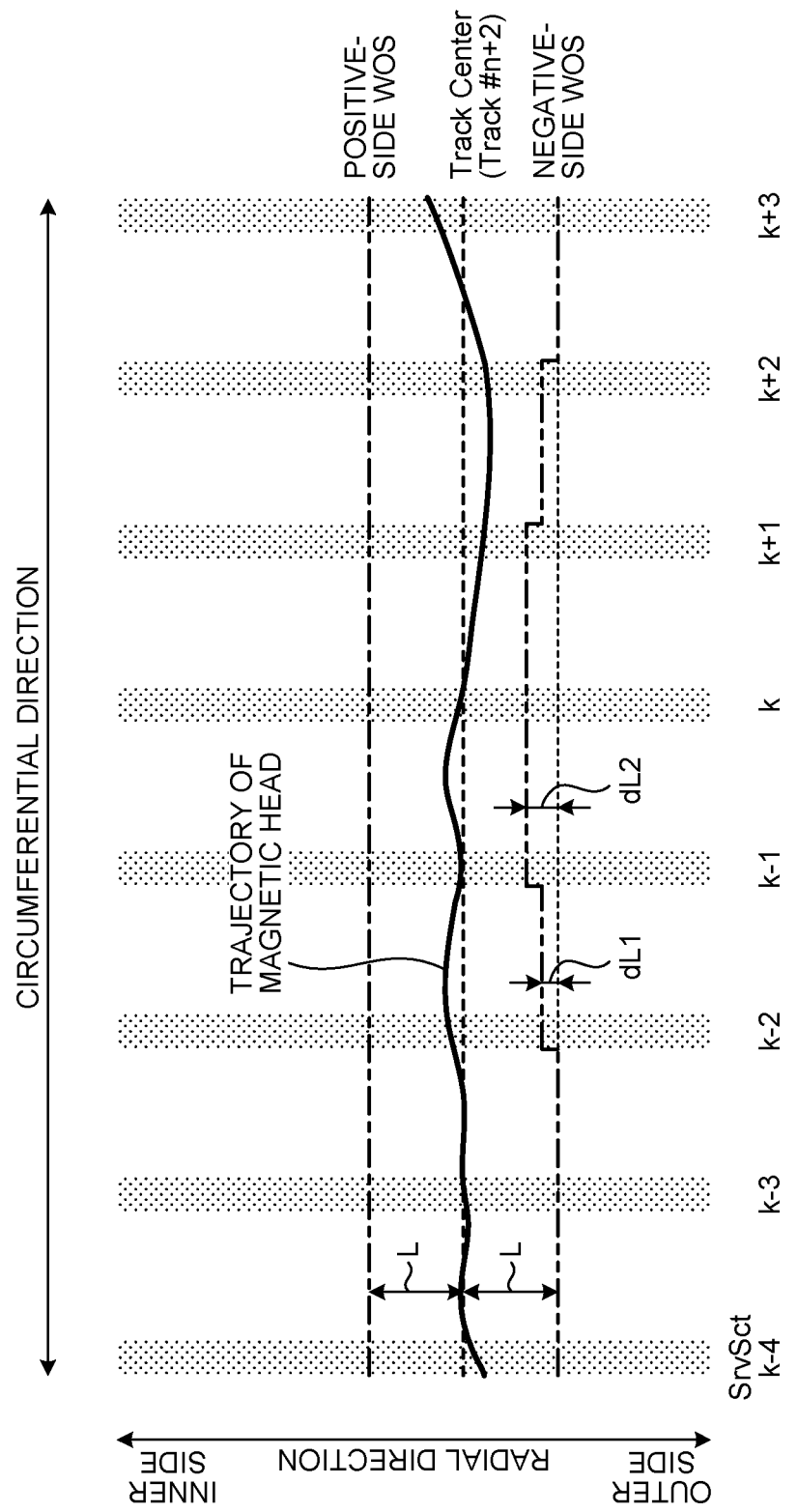
FIG. 7 is a flowchart for explaining another example of the method for setting the WOS according to the first embodiment.

For example, as illustrated in FIG. 7, in tightening the WOS, the controller 30 may change the change amount of the WOS in stages in the circumferential direction in such a manner that the change amount increases as being closer to the servo sector where an overrun has been detected (the servo sector #k in the example of FIG. 7). For example, in FIG. 7, the negative-side WOS corresponding to the track #n+2 is changed in such a manner as to be closer by dL2 to the center of the track #n+2 in the range from the servo sector #k−1 to the servo sector #k+1 including, on the center, the servo sector #k where an overrun to the positive side has been detected in the track #n. Furthermore, the negative-side WOS corresponding to the track #n+2 is changed in such a manner as to be closer by dL1 to the center of the track #n+2 near the servo sector #k−2 and the servo sector #k+2 outside the range from the servo sector #k−1 to the servo sector #k+1 in the circumferential direction of the track #n+2. Note that dL2 is larger than dL1. That is, the controller 30 changes the change amount of the WOS in two stages in the circumferential direction in such a manner that the change amount increases as being closer to the servo sector where an overrun has been detected.

As described above, according to the first embodiment, when an overrun occurs during execution of write to a certain track (referred to as the first track), a condition for write to a second track that is adjacent, at the side to which the magnetic head 22 makes the overrun, to the first track with another track (third track) interposed therebetween is made stricter than when no overrun occurs. Specifically, the WOS (first threshold) corresponding to the second track at the first track side is brought close to the center of the second track. The overrun during execution of write to the first track refers to that the magnetic head 22 is displaced from the center of the first track (that is, the target position) toward another track, and the distance between the target position and the magnetic head 22 exceeds the WOS (first threshold).

Thus, the control of the operation of the magnetic head 22 in writing data to the second track makes it possible to reduce the risk of loss of data of the third track without executing rewrite of the data of the third track. That is, the operation of the magnetic head 22 can be appropriately controlled.

According to the first embodiment, in writing data to the second track, the WOS (second threshold) is used to determine whether the magnetic head 22 is in the on-track state. Specifically, the controller 30 performs control so as not to execute write to the second track when the distance between the target position of the second track and the position of the magnetic head 22 exceeds the WOS (second threshold). The controller 30 performs control so as to execute write to the second track when the distance between the target position of the second track and the position of the magnetic head 22 is less than the WOS (second threshold). When the distance between the target position of the second track and the position of the magnetic head 22 is equal to the WOS (second threshold), the controller 30 may perform control so as to execute write or may perform control so as not to execute write.

In the above, the WOS is used in both the determination of the occurrence of an overrun and the determination as to whether the magnetic head 22 is in the on-track state. The threshold (first threshold) used in the determination of the occurrence of an overrun may be different from the WOS (second threshold) used in the determination as to whether the magnetic head 22 is in the on-track state.

According to the first embodiment, the controller 30 tightens the WOS in the servo sector in the second track (the first position in the circumferential direction of the second track) corresponding to the servo sector where the occurrence of an overrun has been detected in the first track (the second position in the circumferential direction of the first track).

As described above, the controller 30 may tighten the WOS in stages toward the servo sector (the first position in the circumferential direction of the second track) corresponding, in the circumferential direction of the second track, the servo sector where the occurrence of an overrun has been detected in the first track (the second position in the circumferential direction of the first track).

Second Embodiment

In a magnetic disk apparatus, residual vibration of a magnetic head occurs after a seek operation for moving the magnetic head to a target track. Typically, the magnetic disk apparatus executes write after the residual vibration of the magnetic head that occurs after the seek operation is sufficiently damped. Whether the residual vibration of the magnetic head has been sufficiently damped is determined based on whether the number of continuous detections of the position of the magnetic head within a displacement allowable range has reached a threshold (referred to as the vibration damping threshold). When the number of continuous detections of the position of the magnetic head within the displacement allowable range has reached the vibration damping threshold, it can be estimated that the residual vibration of the magnetic head has been sufficiently damped. Thus, the magnetic disk can start write to the target track.

In the second embodiment, the vibration damping threshold is used as the condition that is made stricter when an overrun occurs. For example, when an overrun of the magnetic head toward the track #n+1 occurs in writing data to the track #n, the controller makes the vibration damping threshold in write to the track #n+2 larger than when no overrun of the magnetic head toward the track #n+1 occurs in writing data to the track #n. This makes it possible to take more time to wait for damping of the residual vibration in writing data to the track #n+2 when an overrun of the magnetic head toward the track #n+1 occurs in writing data to the track #n than when no overrun of the magnetic head toward the track #n+1 occurs in writing data to the track #n. As a result, it is possible to reduce the displacement of the magnetic head during write of data to the track #n+2. This reduces the occurrence of an overrun toward the track #n+1, which makes it possible to reduce the influence of the write operation to the track #n+2 on data that has already been written to the track #n+1.

Hereinbelow, the second embodiment will be described. A magnetic disk apparatus according to the second embodiment is referred to as a magnetic disk apparatus 1a. A controller included in the magnetic disk apparatus 1a is referred to as a controller 30a. In the second embodiment, a point that differs from the first embodiment will be described. The same configuration as the first embodiment will be described in a simplified manner, or description thereof will be omitted.

In the magnetic disk apparatus 1a, the controller 30a stores overrun information in the same procedure as the controller 30 of the first embodiment in a write operation. That is, the magnetic disk apparatus 1a executes the series of operations illustrated in FIG. 5.

As described above, the controller 30a is configured to change the vibration damping threshold when an overrun occurs.

Figure 8:
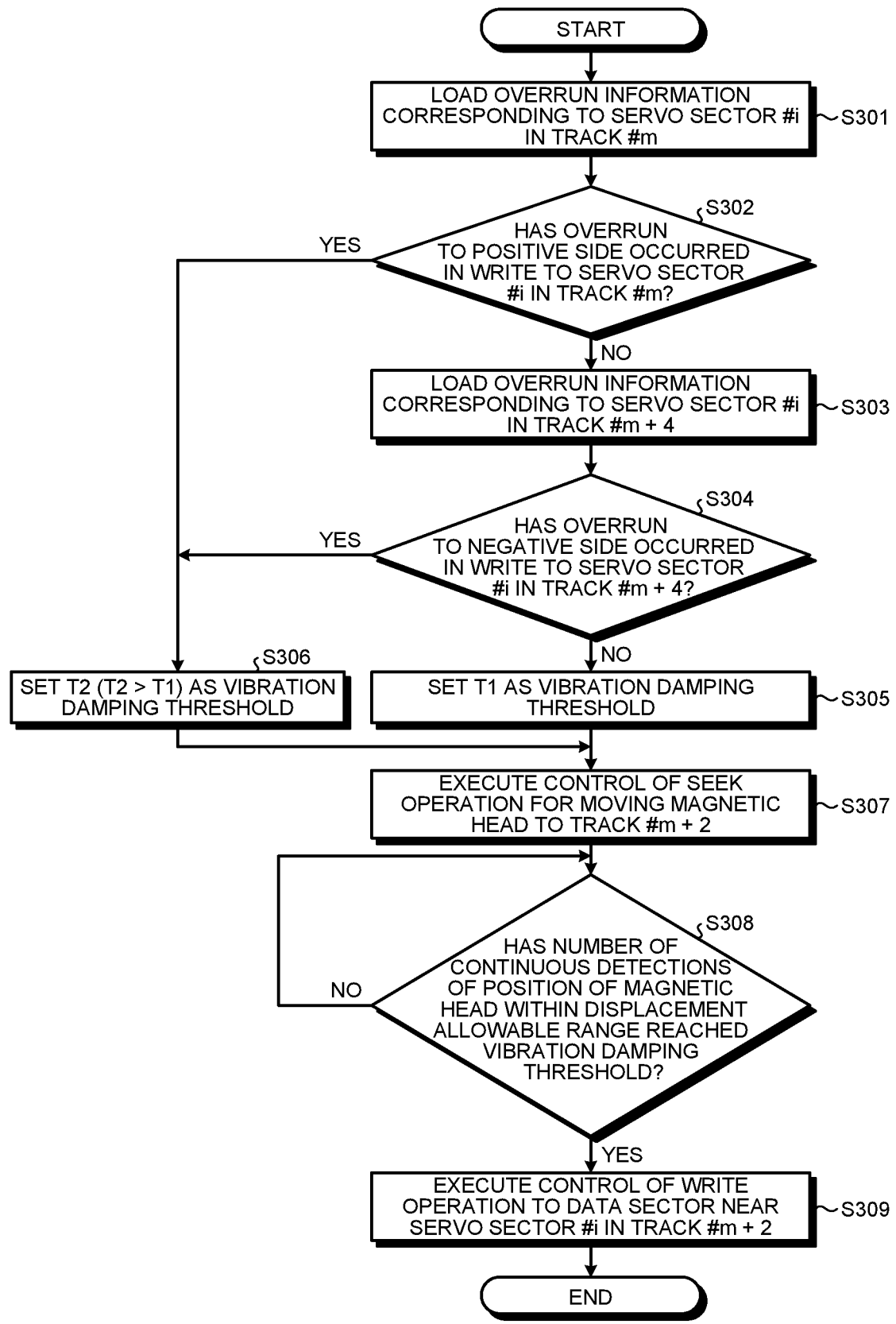
FIG. 8 is a flowchart for explaining a series of operations related to change of a vibration damping threshold according to a second embodiment.

FIG. 8 is a flowchart for explaining a series of operations related to change of the vibration damping threshold according to the second embodiment. The series of operations illustrated in FIG. 8 is executed regardless of which data sector in which track is the write destination. Here, an operation related to change of the vibration damping threshold in executing write to a data sector near the servo sector #i in the track #m+2 will be described. Specifically, the data sector near the servo sector #i in the track #m+2 is a data sector present in a section from the servo sector #i to just before the servo sector #i+1 in the track #m+2.

First, the controller 30a loads overrun information corresponding to the servo sector #i in the track #m (S301).

Then, the controller 30a determines, based on the overrun information corresponding to the servo sector #i in the track m, whether an overrun to the positive side, that is, toward the track #m+1 has occurred in write to the servo sector #i in the track #m (S302).

When it is determined that no overrun to the positive side has occurred in write to the servo sector #i in the track #m (S302: No), the controller 30a loads overrun information corresponding to the servo sector #i in the track #m+4 (S303).

Then, the controller 30a determines, based on the overrun information corresponding to the servo sector #i in the track #m+4, whether an overrun to the negative side, that is, toward the track #m+3 has occurred in write to the servo sector #i in the track #m+4 (S304).

When it is determined that no overrun to the negative side has occurred in write to the servo sector #i in the track #m+4 (S304: No), the controller 30a sets a predetermined value T1 as the vibration damping threshold (S305).

When it is determined that an overrun to the positive side has occurred in write to the servo sector #i in the track #m (S302: Yes), or when it is determined that an overrun to the negative side has occurred in write to the servo sector #i in the track #m+4 (S304: Yes), the controller 30a sets a predetermined value T2 which is larger than T1 as the vibration damping threshold (S306).

After S305 or S306, the controller 30a controls a seek operation for moving the magnetic head 22 to the track #m+2 (S307).

When the magnetic head 22 is moved to the vicinity of the track #m+2, the controller 30a determines, based on a positional error signal that is acquired every time the magnetic head 22 passes through the servo sector, whether the detected position of the magnetic head 22 is located within the displacement allowable range. That is, it is determined whether the magnetic head 22 is in the on-track state. Then, the controller 30a counts the number of continuous detections of the position of the magnetic head 22 within the displacement allowable range.

Then, the controller 30a determines whether the number of continuous detections of the position of the magnetic head 22 within the displacement allowable range has reached the vibration damping threshold (S308). When it is determined that the number of continuous detections of the position of the magnetic head 22 within the displacement allowable range has not reached the vibration damping threshold (S308: No), the controller 30a again executes the process of S308.

When it is determined that the number of continuous detections of the position of the magnetic head 22 within the displacement allowable range has reached the vibration damping threshold (S308: Yes), the controller 30a controls a write operation to the data sector near the servo sector #i in the track #m+2 (S309). In S309, the write operation is executed in the same procedure as the operation illustrated in FIG. 5. After S309, the series of operations related to change of the vibration damping threshold is completed.

In this manner, according to the second embodiment, when an overrun occurs during execution of write to a certain track (first track), a condition for write to a second track that is adjacent, at the side to which the magnetic head 22 makes the overrun, to the first track with another track (third track) interposed therebetween is made stricter than when no overrun occurs. Specifically, the vibration damping threshold in the seek operation for moving the magnetic head 22 to the second track is increased.

Thus, it is possible to reduce the displacement of the magnetic head 22 during write of data to the second track. This reduces the occurrence of an overrun toward the third track during write of data to the second track. That is, the control of the operation of the magnetic head 22 in writing data to the second track makes it possible to reduce the risk of loss of data of the third track without executing rewrite of the data of the third track. That is, the operation of the magnetic head 22 can be appropriately controlled.

Note that the second embodiment can be combined with the first embodiment. That is, the controller 30a may execute tightening the WOS corresponding to the second track and increasing the vibration damping threshold when the seek operation for moving the magnetic head 22 to the second track is performed.

Third Embodiment

The residual vibration after the seek operation can be reduced by lowering the moving speed of the magnetic head in the seek operation (referred to as the seek speed). In a third embodiment, the seek speed is controlled.

For example, when an overrun of the magnetic head toward the track #n+1 occurs in writing data to the track #n, the controller makes a set value of the seek speed of the seek operation executed to write data to the track #n+2 lower than when no overrun of the magnetic head toward the track #n+1 occurs in writing data to the track #n. This makes it possible to reduce the residual vibration after the seek operation and reduce the displacement of the magnetic head during write of data to the track #n+2. As a result, in write to the track #n+2, the occurrence of an overrun toward the track #n+1 is reduced, which makes it possible to reduce the influence of the write operation to the track #n+2 on data that has already been written to the track #n+1.

Note that the magnetic disk apparatus can be configured to execute reordering. The reordering refers to a process of, when the magnetic disk apparatus receives a plurality of commands from the host, reordering the execution order of the commands, thereby efficiently executing the commands. There are some conditions that are taken into consideration in the reordering, and the time required for the seek operation is one of the conditions. That is, the change of the seek speed changes the time required for the seek operation, which affects the reordering process. In the third embodiment, when the seek speed is changed, the reordering is executed based on the changed seek speed.

Hereinbelow, the third embodiment will be described. A magnetic disk apparatus according to the third embodiment is referred to as a magnetic disk apparatus 1b. A controller included in the magnetic disk apparatus 1b is referred to as a controller 30b. Here, a point that differs from the first embodiment or the second embodiment will be described. The same configuration as the first embodiment or the second embodiment will be described in a simplified manner, or description thereof will be omitted.

In the magnetic disk apparatus 1b, the controller 30b stores overrun information in the same procedure as the controller 30 of the first embodiment in a write operation. That is, the magnetic disk apparatus 1b executes the series of operations illustrated in FIG. 5.

Figure 9:
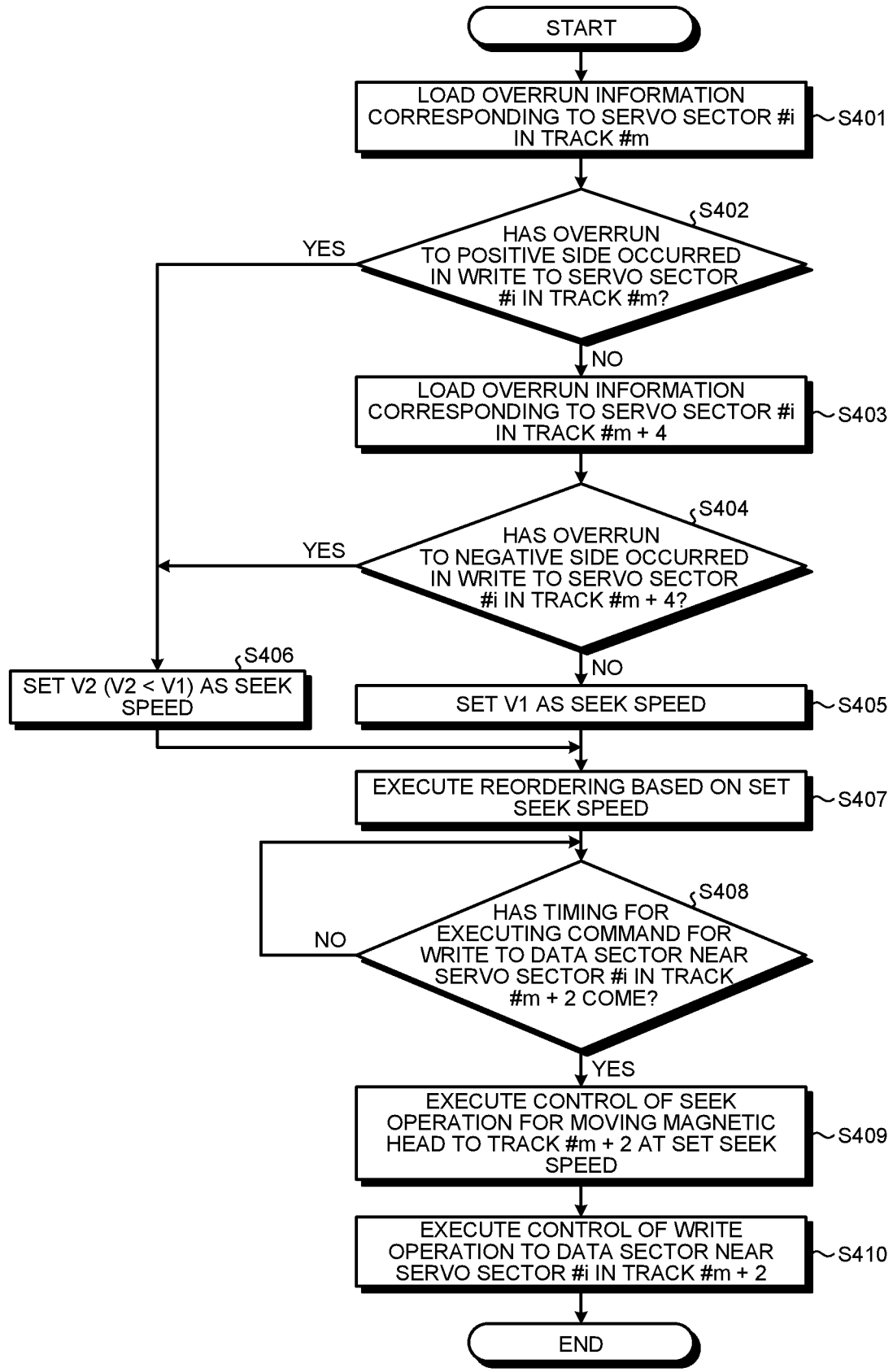
FIG. 9 is a flowchart for explaining a series of operations related to change of a seek speed according to a third embodiment.

FIG. 9 is a flowchart for explaining a series of operations related to change of the seek speed according to the third embodiment. The series of operations illustrated in FIG. 9 is executed regardless of which data sector in which track is the write destination. Here, an operation related to change of the seek speed in executing write to a data sector near the servo sector #i in the track #m+2 will be described. Specifically, the data sector near the servo sector #i in the track m+2 is a data sector present in a section from the servo sector #i to just before the servo sector #i+1 in the track #m+2.

First, the controller 30*b* executes, in S401 to S404, the same processes as S301 to S304 of FIG. 8.

Then, when it is determined that no overrun to the positive side has occurred in write to the servo sector #i in the track #m (S402: No), and when it is determined that no overrun to the negative side has occurred in write to the servo sector #i in the track #m+4 (S404: No), the controller 30*b* sets a predetermined value V1 as the seek speed (S405).

When it is determined that an overrun to the positive side has occurred in write to the servo sector #i in the track #m (S402: Yes), or when it is determined that an overrun to the negative side has occurred in write to the servo sector #i in the track #m+4 (S404: Yes), the controller 30*b* sets a predetermined value V2 which is smaller than V1 as the seek speed (S406). Note that the seek speed set in each of S405 and S406 is the speed of the magnetic head 22 in a seek operation for moving the magnetic disk 11 to the track #m+2. The seek speed set in S405 or S406 is not applied to a seek operation to the other tracks.

After S405 or S406, the controller 30*b* executes reordering based on the set seek speed (S407). That is, when the controller 30*b* has already received, from the host 2, a plurality of commands including a command for write to the data sector near the servo sector #i in the track #m+2, the controller 30*b* determines the execution order of the commands based on the set seek speed.

After the execution of reordering, the controller 30*b* sequentially executes the commands in the order determined by the reordering. Then, the controller 30*b* determines whether the timing for executing the command for write to the data sector near the servo sector #i in the track #m+2 has come (S408). When the timing for executing the command for write to the data sector near the servo sector #i in the track #m+2 has not come (S408: No), the controller 30*b* again executes the process of S408.

When the timing for executing the command for write to the data sector near the servo sector #i in the track #m+2 has come (S408: Yes), the controller 30*b* executes control of a seek operation for moving the magnetic head 22 to the track #m+2 at the set seek speed (S409).

Then, when the seek operation is completed, the controller 30*b* executes control of a write operation to the data sector near the servo sector #i in the track #m+2 (S410). In S410, the write operation is executed in the same procedure as the operation illustrated in FIG. 5. After S410, the series of operations related to change of the seek speed is completed.

In this manner, according to the third embodiment, when an overrun occurs during execution of write to a certain track (first track), the controller 30*b* makes the set value of the moving speed of the magnetic head 22 in the seek operation for write to a second track that is adjacent, at the side to which the magnetic head 22 makes the overrun, to the first track with another track (third track) interposed therebetween smaller than when no overrun occurs.

Thus, it is possible to reduce the displacement of the magnetic head 22 during write of data to the second track. This reduces the occurrence of an overrun toward the third track during write of data to the second track. That is, the control of the operation of the magnetic head 22 in writing data to the second track makes it possible to reduce the risk of loss of data of the third track without executing rewrite of the data of the third track. That is, the operation of the magnetic head 22 can be appropriately controlled.

According to the third embodiment, the controller 30*b* executes reordering based on the set value of the moving speed of the magnetic head 22, the set value being determined based on the presence or absence of overrun. That is, the controller 30*b* determines the execution order of a plurality of commands received from the host based on the set value of the moving speed of the magnetic head 22, the set value being determined based on the presence or absence of overrun.

Thus, the efficiency is improved by the reordering.

Note that the third embodiment can be combined with both of the first embodiment and the second embodiment.

As described above, according to the first to third embodiments, when, during execution of write to a certain track (referred to as the first track), the magnetic head 22 makes an overrun toward the second track, the controllers 30, 30*a*, and 30*b* control write to the second track under the condition different from the condition for when the magnetic head 22 makes no overrun toward the second track.

Thus, the control of the operation of the magnetic head 22 in writing data to the second track makes it possible to reduce the risk of loss of data of the track interposed between the first track and the second track without executing rewrite of the data of the track interposed between the first track and the second track. That is, the operation of the magnetic head 22 can be appropriately controlled.

First Modification

Hereinbelow, a first modification will be described as a modification according to the first to third embodiments.

The condition that is made stricter when the occurrence of an overrun has been detected can be variously modified. Instead of or in addition to the conditions that are made stricter in the first to third embodiments, a condition described below can be made stricter.

For example, the controllers 30, 30*a*, and 30*b* may be configured to determine whether the magnetic head 22 is in the on-track state by estimation based on regression analysis using a filter (e.g., an FIR filter). In such a case, when the magnetic head 22 makes an overrun toward the second track in write to the first track, the controllers 30, 30*a*, and 30*b* may switch a parameter of the above filter so as to enable estimation under a stricter condition in write to the second track than when the magnetic head 22 makes no overrun toward the second track in write to the first track.

The controllers 30, 30*a*, and 30*b* execute the feedback control described in the first embodiment in positioning the magnetic head 22. The feedback control uses various parameters such as a gain for determining the strength to converge vibration caused by disturbances. When the magnetic head 22 makes an overrun toward the second track in write to the first track, the controllers 30, 30*a*, and 30*b* may use, as a parameter of the feedback control, a value that is different from a value used when the magnetic head 22 makes no overrun toward the second track in write to the first track. For example, when the magnetic head 22 makes an overrun toward the second track in write to the first track, the controllers 30, 30*a*, and 30*b* may increase the gain for determining the strength to converge vibration caused by disturbances in write to the second track.

When the magnetic head 22 makes an overrun toward the second track in write to the first track, the controllers 30, 30*a*, and 30*b* may shift the center of the second track to the side opposite to the first track in write to the second track. With this configuration, even if an overrun toward the third track interposed between the first track and the second track occurs in write to the second track, it is possible to reduce the influence of write to the second track on data of the third track because the center of the second track, which is the target position for write to the second track, is shifted to the side opposite to the third track. That is, it is possible to reduce the risk of loss of data of the third track without executing rewrite of the data of the third track.

The magnetic disk apparatuses 1, 1a, and 1b include an acceleration sensor, and the controllers 30, 30a, and 30b are capable of detecting vibration or shock applied to the magnetic disk apparatuses 1, 1a, and 1b from the outside by using the acceleration sensor. In response to detection of vibration or shock, the controllers 30, 30a, and 30b execute various control operations such as stopping write and retracting the magnetic head 22 onto the ramp 13. When the magnetic head 22 makes an overrun toward the second track in write to the first track, the controllers 30, 30a, and 30b may make the sensitivity of detection of vibration or shock higher in write to the second track than when the magnetic head 22 makes no overrun toward the second track in write to the first track. A method for increasing the sensitivity of detection of vibration or shock is not limited to any particular method. For example, the controllers 30, 30a, and 30b can increase the sensitivity of detection of vibration or shock by increasing the sensitivity of the acceleration sensor. Alternatively, the controllers 30, 30a, and 30b can increase the sensitivity of detection of vibration or shock by lowering a threshold for detection of vibration or shock, the threshold being compared with a detection value of the acceleration sensor.

The controllers 30, 30a, and 30b may change a degree by which the condition for write is made stricter according to the situations.

As the temperature of the magnetic disk apparatuses 1, 1a, and 1b increases, the influence of the ATI increases. The magnetic disk apparatuses 1, 1a, and 1b may include a temperature sensor, and the controllers 30, 30a, and 30b may make the condition for write stricter as a detection value of the temperature sensor increases. For example, when the magnetic head 22 makes an overrun toward the second track in write to the first track, the controllers 30, 30a, and 30b bring the WOS closer to the center of the second track in write to the second track than when the magnetic head 22 makes no overrun toward the second track in write to the first track. At this time, the controllers 30, 30a, and 30b acquire a detection value of the temperature sensor and increase an amount by which the WOS is brought close to the center of the second track as the acquired detection value increases.

The magnetic disk apparatuses 1, 1a, and 1b include an acceleration sensor. The controllers 30, 30a, and 30b may make the condition for write stricter as a detection value of the acceleration sensor increases. For example, when the magnetic head 22 makes an overrun toward the second track in write to the first track, the controllers 30, 30a, and 30b bring the WOS closer to the center of the second track in write to the second track than when the magnetic head 22 makes no overrun toward the second track in write to the first track. At this time, the controllers 30, 30a, and 30b acquire a detection value of the acceleration sensor and increase an amount by which the WOS is brought close to the center of the second track as the acquired detection value increases.

The controllers 30, 30a, and 30b may make the condition for write stricter as a track pitch margin decreases. The track pitch margin is an amount obtained by subtracting a track pitch required to ensure the minimum write/read quality from an actual interval between tracks (track pitch). The track pitch margin can also be referred to as a track density margin or a TPI margin. For example, when the magnetic head 22 makes an overrun toward the second track in write to the first track, the controllers 30, 30a, and 30b bring the WOS closer to the center of the second track in write to the second track than when the magnetic head 22 makes no overrun toward the second track in write to the first track. At this time, the controllers 30, 30a, and 30b acquire a track pitch margin corresponding to the second track and increase an amount by which the WOS is brought close to the center of the second track as the acquired track pitch margin decreases.

The controllers 30, 30a, and 30b may make the condition for write stricter according to deterioration in the linearity of demodulation of the positional error signal from servo information. For example, when the magnetic head 22 makes an overrun toward the second track in write to the first track, the controllers 30, 30a, and 30b bring the WOS closer to the center of the second track in write to the second track than when the magnetic head 22 makes no overrun toward the second track in write to the first track. At this time, the controllers 30, 30a, and 30b increase an amount by which the WOS is brought close to the center of the second track as the linearity of demodulation of the positional error signal in write to the second track decreases.

The center of the track can be off the rotation center of the magnetic disk 11. The eccentric direction and the eccentricity may differ between two tracks that are adjacent to each other. In such a case, there can be a part where the distance between the two tracks (that is, the track pitch) is narrower than in the other part. The controllers 30, 30a, and 30b may make the condition for write stricter as the track pitch decreases. For example, when the magnetic head 22 makes an overrun toward the second track in write to the first track, the controllers 30, 30a, and 30b bring the WOS closer to the center of the second track in write to the second track than when the magnetic head 22 makes no overrun toward the second track in write to the first track. At this time, the controllers 30, 30a, and 30b increase an amount by which the WOS is brought close to the center of the second track as the interval between the second track and the third track decreases.

The controllers 30, 30a, and 30b store an evaluation value indicating the degree of the influence of the ATI for each track. When data is written to a certain track, the controllers 30, 30a, and 30b increases the evaluation value corresponding to a track near the certain track. When the evaluation value becomes equal to or higher than a predetermined value, the controllers 30, 30a, and 30b execute rewrite of data of the track having the evaluation value equal to or higher than the predetermined value. The controllers 30, 30a, and 30b may make the condition for write stricter as the evaluation value increases. For example, when the magnetic head 22 makes an overrun toward the second track in write to the first track, the controllers 30, 30a, and 30b bring the WOS closer to the center of the second track in write to the second track than when the magnetic head 22 makes no overrun toward the second track in write to the first track. At this time, the controllers 30, 30a, and 30b increase an amount by which the WOS is brought close to the center of the second track as the evaluation value corresponding to the third track increases.

In this manner, the degree by which the condition for write is made stricter may be changed according to various factors. According to the above examples, the condition for write is the WOS, the vibration damping threshold, the set value of the seek speed, the parameter of the filter used in the determination of the on-track state, the parameter used in the positioning control (feedback control), setting of the center position of the track, the sensitivity of detection of vibration or shock, or a combination of these conditions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   a magnetic disk including a plurality of tracks, the plurality of tracks including a first track and a second track;
   a magnetic head that is controlled to perform read/write from/to the plurality of tracks; and
   a controller that is configured to
      control the magnetic head to perform read/write from/to the plurality of tracks, and
      set a selected value of a condition for the magnetic head to execute write to the second track, to a first value when, during execution of write to the first track by the magnetic head, a first position of the magnetic head is displaced from a target position corresponding to the first track toward the second track, and a first distance between the target position corresponding to the first track and the first position of the magnetic head exceeds a first threshold, and to a second value larger than the first value when, during execution of write to the first track by the magnetic head, the first distance is less than the first threshold, wherein
   the selected value is a second threshold, and
   the controller is further configured to control the magnetic head so as not to execute write to the second track when a second distance between a target position corresponding to the second track and a second position of the magnetic head exceeds the second threshold and so as to execute write to the second track when the second distance is less than the second threshold.

2. The magnetic disk apparatus according to claim 1, wherein
   one of the plurality of tracks is interposed between the first track and the second track.

3. The magnetic disk apparatus according to claim 1, wherein
   the controller is further configured to, when the first distance exceeds the first threshold, reduce the second threshold at a third position in a circumferential direction of the second track, the third position corresponding to a fourth position in a circumferential direction of the first track where the first distance exceeds the first threshold.

4. The magnetic disk apparatus according to claim 2, wherein
   the controller is further configured to, when the first distance exceeds the first threshold, reduce the second threshold at a third position in a circumferential direction of the second track, the third position corresponding to a fourth position in a circumferential direction of the first track where the first distance exceeds the first threshold.

5. The magnetic disk apparatus according to claim 3, wherein
   the controller is further configured to, when the first distance exceeds the first threshold, reduce the second threshold in stages toward the third position in the circumferential direction of the second track.

6. The magnetic disk apparatus according to claim 4, wherein
   the controller is further configured to, when the first distance exceeds the first threshold, reduce the second threshold in stages toward the third position in the circumferential direction of the second track.

7. The magnetic disk apparatus according to claim 1, wherein
   the condition further includes a third threshold, and
   the controller is further configured to
      make the third threshold larger when the first distance exceeds the first threshold, than the third threshold when the first distance is less than the first threshold,
      determine whether the magnetic head is in an on-track state at a plurality of different timings after the magnetic head is moved to the second track, and
      control the magnetic head to start write to the second track when a number of continuous acquisitions of a determination result indicating that the magnetic head is in the on-track state reaches the third threshold.

8. The magnetic disk apparatus according to claim 2, wherein
   the condition further includes a third threshold, and
   the controller is further configured to
      make the third threshold larger when the first distance exceeds the first threshold, than the third threshold when the first distance is less than the first threshold,
      determine whether the magnetic head is in an on-track state at a plurality of different timings after the magnetic head is moved to the second track, and
      control the magnetic head to start write to the second track when a number of continuous acquisitions of a determination result indicating that the magnetic head is in the on-track state reaches the third threshold.

9. The magnetic disk apparatus according to claim 1, wherein
   the condition further includes a speed set value, and
   the controller is further configured to make the speed set value smaller when the first distance exceeds the first threshold, than the speed set value when the first distance is less than the first threshold, and move the magnetic head to the second track at a speed equal to the speed set value.

10. The magnetic disk apparatus according to claim 2, wherein
    the condition further includes a speed set value, and
    the controller is further configured to make the speed set value smaller when the first distance exceeds the first threshold, than the speed set value when the first distance is less than the first threshold, and move the magnetic head to the second track at a speed equal to the speed set value.

11. The magnetic disk apparatus according to claim 9, wherein
    the magnetic disk apparatus is connectable to a host, and
    the controller is further configured to receive a plurality of commands from the host and determine, based on the speed set value, execution order of the commands.

12. The magnetic disk apparatus according to claim 10, wherein
the magnetic disk apparatus is connectable to a host, and
the controller is further configured to receive a plurality of commands from the host and determine, based on the speed set value, execution order of the commands.

13. A magnetic disk apparatus comprising:
a magnetic disk including a plurality of tracks, the plurality of tracks including a first track, a second track, and a third track located between the first track and the second track;
a magnetic head that is controlled to perform read/write from/to the plurality of tracks; and
a controller that is configured to
control the magnetic head to perform read/write from/to the plurality of tracks,
change a write condition for the magnetic head executing write to the second track when, during execution of write to the first track by the magnetic head, a first position of the magnetic head is displaced from a target position corresponding to the first track toward the second track, and a first distance between the target position corresponding to the first track and the first position of the magnetic head exceeds a first threshold, and
control the magnetic head so as not to execute write to the second track when a second distance between a target position corresponding to the second track and a second position of the magnetic head exceeds a second threshold and so as to execute write to the second track when the second distance is less than the second threshold, wherein
the change made by the controller to the write condition for the magnetic head executing write to the second track, is making the second threshold smaller.

14. A method for controlling a magnetic disk apparatus, the magnetic disk apparatus comprising a magnetic disk including a plurality of tracks, the plurality of tracks including a first track and a second track, and a magnetic head that is controlled to perform read/write from/to the plurality of tracks, the method comprising:
controlling the magnetic head to perform read/write from/to the plurality of tracks;
detecting that, during execution of write to the first track by the magnetic head, a first position of the magnetic head is displaced from a target position corresponding to the first track toward the second track, and a first distance between the target position corresponding to the first track and the first position of the magnetic head exceeds a first threshold; and
setting a selected value of a condition for the magnetic head to execute write to the second track, to a first value when detecting that the first distance exceeds the first threshold, and to a second value larger than the first value when the first distance is less than the first threshold, wherein
the selected value is a second threshold, and
the method further comprises controlling the magnetic head so as not to execute write to the second track when a second distance between a target position corresponding to the second track and a second position of the magnetic head exceeds the second threshold and so as to execute write to the second track when the second distance is less than the second threshold.

15. The method according to claim 14, wherein
one of the plurality of tracks is interposed between the first track and the second track.

16. The method according to claim 14, wherein
the condition further includes a third threshold, and
the method further comprises:
making the third threshold larger when the first distance exceeds the first threshold, than the third threshold when the first distance is less than the first threshold;
determining whether the magnetic head is in an on-track state at a plurality of different timings after the magnetic head is moved to the second track; and
controlling the magnetic head to start write to the second track when a number of continuous acquisitions of a determination result indicating that the magnetic head is in the on-track state reaches the third threshold.

17. The method according to claim 14, wherein
the condition further includes a speed set value, and
the method further comprises:
making the speed set value smaller when the first distance exceeds the first threshold, than the speed set value when the first distance is less than the first threshold; and
moving the magnetic head to the second track at a speed equal to the speed set value.

* * * * *